July 13, 1937.  J. EGGERT ET AL  2,086,859
PRINTING OF LENTICULAR FILM
Filed June 27, 1934

Inventors:
John Eggert,
Gerd Heymer,
By Attorneys
Potter, Pierce & Scheffler

Patented July 13, 1937

2,086,859

UNITED STATES PATENT OFFICE 2,086,859

PRINTING OF LENTICULAR FILM

John Eggert, Leipzig-Gohlis, and Gerd Heymer, Wolfen Kreis, Bitterfeld, Germany, assignors to I. G. Farbenindustrie Aktiengesellschaft, Frankfort-on-the-Main, Germany Application June 27, 1934, Serial No. 732,702
In Germany June 30, 1933

3 Claims. (Cl. 95—75)

Our present invention relates to printing lenticular film and more particularly to contact printing lenticular film.

Figure 1:
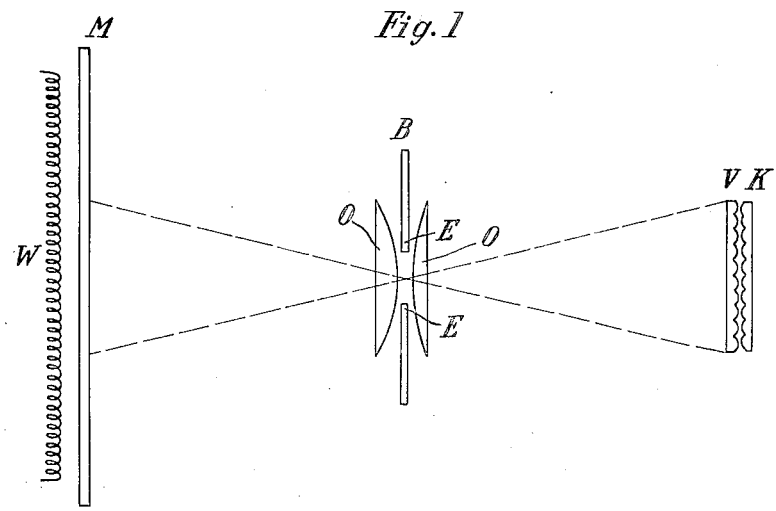
Figure 2:
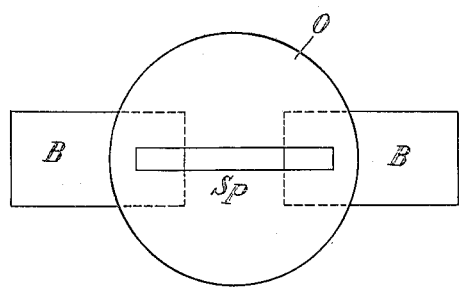

One of its objects is a process for contact printing lenticular film. Another object is an apparatus for contact printing lenticular film. Further objects will be seen from the detailed specification following hereafter. Reference is made to the accompanying drawing in which:

Fig. 1 shows diagrammatically an arrangement for printing according to this invention, and Fig. 2 shows a front view of the objective shown in Fig. 1 with the slot and diaphragm slides to limit the extension of the slot.

In printing a lenticular film on another lenticular film, the embossed sides of the films being in contact with each other, moiré effects are avoided by illuminating the printing film with a source of light which is moved during the printing operation through a certain minimum distance. In this manner a uniform illumination of the whole range is hardly obtainable and the apparatus necessary for carrying out this process is rather complicated.

This invention relates to a method of printing by which a uniform illumination of the film is obtained with the possibility of an easy regulation of the dimension of the source of light in the direction perpendicular to the lenticular elements by arranging a lens or lens system is arranged between the source of light having the form of an illuminated plane and the layer to be illuminated, so that by the lens or lens system a uniformly illuminated white plane is projected on the photographic layer. This may be realized by arranging in the lens system a slot extending perpendicularly to the lenticular elements and having its extension limited by a controllable diaphragm. As a source of light any uniformly bright plane is suitable, for instance, an illuminated ground glass plane or opal glass plate, or another diffuse translucent or reflecting plane.

The accompanying drawing illustrates the invention:

In Fig. 1 M is an opal glass plate, which is illuminated by a number of linolite lamps W arranged closely above each other, so that the illumination of the opal glass plate is uniform. At V there is arranged the original film and at K the film on which it is to be printed. A picture of the opal glass plate is projected on the films VK by means of the objective OO. Generally it is advisable to project this picture not as sharply as possible but somewhat unsharply in order to avoid the sharp focussing on V of small particles of dust on M whereby these particles would appear in the print. Between the parts of the objective OO there is fixed a slot Sp, as shown in Fig. 2. This slot is as narrow as possible in the direction parallel with the lenticular elements, and its length can be controlled by the diaphragm slides BB, so that the length of the slot is determined by the edges EE. This possibility of controlling the length of the slot is necessary, because with different lenticular elements, for instance, different aperture of the lenticular elements different lengths of the slot are necessary.

The present invention may be used alone for printing or it may be used, for instance in combination, with the inventions described in our co-pending applications Ser. No. 705,604, filed Jan. 6, 1934 and Ser. No. 713,187, filed Feb. 27, 1934.

What we claim is:

1. A process of contact printing a lenticular film on another lenticular film which comprises arranging an original and a printing film with the lenticular elements in contact and parallel with each other, and projecting a slot shaped picture of a uniformly illuminated plane on the films so that it extends perpendicularly to the lenticular elements.

2. In contact printing a lenticular film on another lenticular film in combination, an original and a printing film arranged with their lenticular elements in contact and parallel with each other, a uniformly illuminated plane arranged on the side of the original, and a lens or lens system arranged between said plane and said films adapted to project a picture of said plane on said films a slot arranged in fixed connection with said lens or lens system and extending perpendicularly to the lenticular elements.

3. In contact printing a lenticular film on another lenticular film in combination, an original and a printing film arranged with their lenticular elements in contact and parallel with each other, a uniformly illuminated plane arranged on the side of the original, a lens or lens system arranged between said plane and said films adapted to project a picture of said plane on said films, a slot arranged in fixed connection with said lens or lens system and extending perpendicularly to the lenticular elements, and two diaphragm slides for limiting the extension of said slot.

JOHN EGGERT.
GERD HEYMER.